No. 678,205. Patented July 9, 1901.
L. TABOR.
MACHINE FOR MANUFACTURING SCREWS.
(Application filed Apr. 1, 1901.)
(No Model.)

WITNESSES:
M. E. Verbeck
Edith L. Miller

INVENTOR
Leroy Tabor
BY
Eugene Owen
ATTORNEY

UNITED STATES PATENT OFFICE.

LEROY TABOR, OF ELMIRA, NEW YORK.

MACHINE FOR MANUFACTURING SCREWS.

SPECIFICATION forming part of Letters Patent No. 678,205, dated July 9, 1901.

Application filed April 1, 1901. Serial No. 53,818. (No model.)

*To all whom it may concern:*

Be it known that I, LEROY TABOR, a citizen of the United States, residing at Elmira, in the county of Chemung and State of New York, have invented certain new and useful Improvements in Machines for Manufacturing Screws, &c., of which the following is a specification.

My invention relates to improvements in the screw-machine described in Letters Patent of the United States No. 469,201, granted to James B. Clyne on the 16th of February, 1892; and the object of my improvements is to provide means whereby a material saving in time will be attained in changing the speed of the drive-shaft when operating the mechanism for retiring and rotating the tool-turret. In this machine as heretofore constructed the speed-changing mechanism for this purpose consists of a tight and loose pulley on the drive-shaft, with means for shifting the drive-belt from the loose to the tight pulley at the proper periods. In this shifting of the belt from one pulley to the other time is lost not only during the period of shifting, but also by reason of the slippage of the belt in bringing one or the other pulley up to the belt speed.

By my improvements I do away with one of the pulleys and the belt-shifting feature and accomplish the speed change by means of an almost instantaneously-operating clutch, by which arrangement the drive-pulley is run constantly at the belt speed and a positive and quick change is made from one speed to the other and back again, whereby it will be apparent that much time will be saved in the operation of the machine, resulting in a very material increase in the output.

I attain my object by means of the construction and arrangements of parts illustrated in the accompanying drawings, in which—

Figure 1:
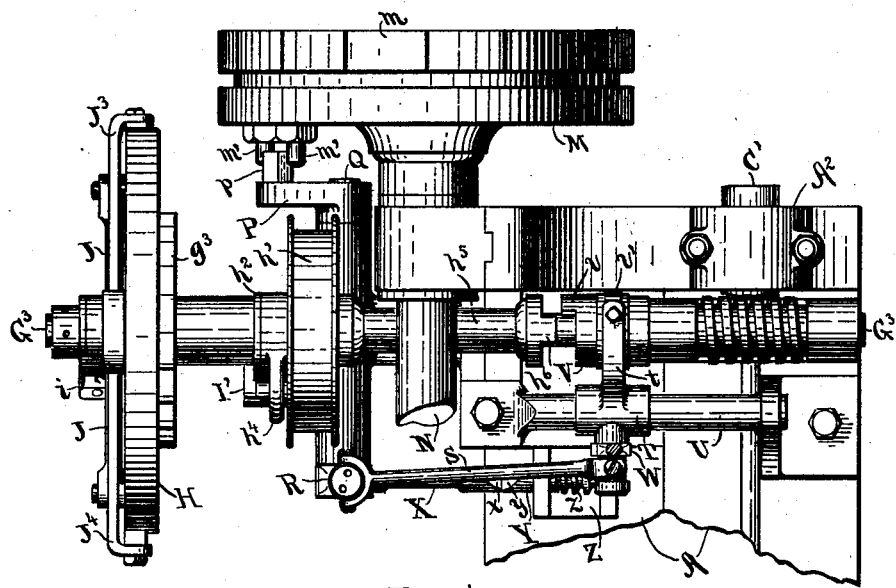
Figure 2:
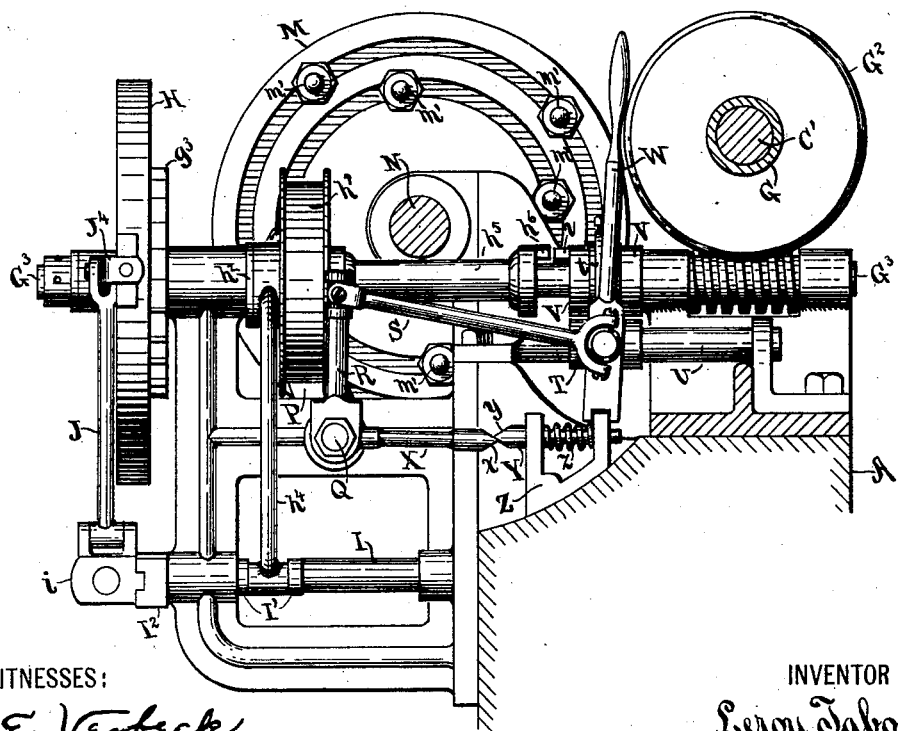

Figure 1 shows a plan view of so much of the machine as involves my improvements, and Fig. 2 a transverse elevation thereof.

Similar letters refer to like parts in both views, and in lettering the old parts of the machine I have used the same lettering to designate like parts as used in the specification accompanying the Letters Patent aforesaid.

A represents the bed of the machine, and $A^2$ the pedestal or box at the rear end of the machine, in which the turret-shaft $C'$ is journaled.

G represents the clutch or turret actuating sleeve, which is loosely mounted upon the shaft $C'$ and to which is secured a worm-gear $G^2$, driven by the worm on the drive-shaft $G^3$.

In the position assumed for the parts in the drawings one of the studs $m'$, located in the inner groove, is about to throw the arm P to the left, thereby throwing the clutch V into engagement with the sleeve $h^5$. As, however, the tooth $v$ may happen to be opposite the tooth $h^6$ at the instant of shifting, (in which event said teeth in coming up against one another would either cause the machine to stop or, if not that, would cause a breakage of some part of the shifting mechanism,) there must be an elasticity in said shifting mechanism to provide against such contingency. In order to attain such elasticity, I provide an arm X, which projects from the hub of the arm R and has at its free end a wedge-shaped point $x$. This pointed end of the arm X is engaged by a similar wedge-point $y$ on the latch-bar Y, which reciprocates in the bracket Z, attached to the bed A. This latch-bar is pressed to the left or against the point of the arm X by means of the spring $z$.

In operation the stud $m'$ will throw the arm P in passing by the head $p$ just sufficiently to cause the point of the arm X to pass above the point of the latch-bar Y, the teeth $h^6$ and $v$ of the clutch mechanism being spaced apart sufficiently to allow for this motion of the shifting mechanism before they are brought into engagement with one another. As soon as the point of the arm X has been brought above the point of the latch-bar Y the upper wedge-face of said bar will be pressed against the lower wedge-face of the arm X by the spring $z$, thereby forcing the arm X upward and throwing the arm R still farther to the left to throw the clutch-teeth into proper engagement. It will be apparent that should said clutch-teeth happen to be in alinement at the time of shifting they will only be brought up against one another by reason of the action of the latch-bar Y, remaining in such position until the one tooth has passed by the other, after which said latch-bar will act to move the clutch-sleeve V the remaining portion of its throw. For the return motion or release of the clutch the stud $m'$ next in order on the wheel M, in the outer groove thereof, will act on the outer incline of the head $p$ to throw the arm P to the right, and the relative positions of said stud $m'$ and head $p$ will be such as to throw said arm a sufficient distance to the right to cause the point of the arm X to pass below the point of the latch-bar Y just before the clutch-sleeve reaches the end of its extreme right-hand throw, the slight remaining motion of said sleeve to the right being accomplished by the lower face of the wedge-point $y$ pressing against the upper face of the wedge-point X. The latch-bar, moreover, acts to hold the clutch-sleeve in its extreme forward and back positions while the arm P is disengaged. While I have described in the elements X and Y one means to accomplish this elasticity in throwing the clutch mechanism, I do not desire to be limited to this precise arrangement for this part of the mechanism, since other means for accomplishing the same result will readily occur to those skilled in the art.

H is a disk loosely mounted upon the shaft $G^3$ and driven by the friction-pawls $J^3$ and $J^4$, which are actuated by pitmen J J, coupled to a sliding block $i$, which is automatically set at desirable points of eccentricity across the head $I^2$ by mechanism not herein shown, this part of the machine not entering into my invention. The head $I^2$ is oscillated by the shaft I, which in turn is driven by the connecting-rod $h^4$, running from the eccentric $h^2$ to the rock-arm $I'$ on the shaft I. The eccentric $h^2$ is attached to and driven by the pulley $h'$, which is loosely mounted upon the shaft $G^3$. Through this oscillating mechanism, all the parts of which are fully described in said Letters Patent and in which I have made no change, motion is imparted to the disk H and from it, by means of the ratchet-wheel $g^3$ and a suitable pawl, (not shown,) to the shaft $G^3$, the ratchet-wheel $g^3$ being rigidly mounted upon said shaft $G^3$.

The parts of the machine so far described constitute the mechanism for imparting the comparatively slow and adjustable forward-feeding motion to the tools held in the turret, and there is no change so far from the patented device. My change lies in substituting a clutch mechanism for the tight pulley on the shaft $G^3$ for increasing the speed of the shaft to that of the drive-belt during the periods of imparting backward and rotating motions to the turret after the tools therein have done their work.

To the pulley $h'$ I attach a sleeve $h^5$, which revolves with the pulley loosely upon the shaft $G^3$, suitable means being provided to prevent longitudinal motion of the pulley and sleeve on said shaft.

$h^6$ is a clutch-tooth projecting from the enlarged end of the sleeve $h^5$, this clutch-tooth being engaged by a similar tooth $v$, projecting from the sliding clutch-sleeve V, which is feathered upon the shaft $G^3$, so that when the clutch-teeth $h^6$ and $v$ are in engagement the speed of the drive-pulley $h'$ will be imparted directly to the shaft $G^3$ during the backward and rotating motions of the turret. In order to impart motion to the clutch-sleeve V along the shaft $G^3$ at the proper moments, I employ the following elements: $t$ represents a yoke which projects from a slide T, supported upon the stationary guide-rod U, the arms of the yoke being secured to a ring $v'$, which is loosely mounted upon the clutch-sleeve V. Coupled to a stud projecting forward from the slide T is a connecting-bar S, the other end of which is coupled to an arm R, attached to the rock-shaft Q, to the rear end of which shaft is attached an arm P, provided with a V-shaped projection or head $p$, which is set in proximity to the inner or forward face of the speed-regulating wheel M. This speed-regulating wheel is provided with a series of studs $m'$, adjustably fastened in two annular grooves in the face thereof and adapted to engage the one or the other incline of the head $p$ for the purpose of shifting the clutch, the wheel M and the shifting-studs $m'$ being and operating the same as described in said Letters Patent, said wheel M being secured upon the shaft N, which is driven by gear-wheels (not shown) from the sleeve G.

W represents a hand-lever for throwing the clutch V independently of the automatic shifting devices, this lever being pivoted upon the stud projecting from the guide-sleeve T and being fulcrumed below, as upon one branch of the bracket Z, as indicated in Fig. 2.

Having thus described my improvements, what I claim as my invention, and desire to secure by Letters Patent, is—

1. The combination, with a turret-actuating sleeve, a drive-shaft operatively connected with said sleeve and the variable-feed mechanism therefor comprising a pulley carrying an eccentric loosely mounted upon said shaft and an oscillating shaft actuated by said eccentric and operatively connected with said drive-shaft by means of an adjustable ratchet mechanism for varying the speed of the drive-shaft, of an automatic clutch and shifting device timed to connect the loose pulley directly with the drive-shaft during the periods when the turret-actuating sleeve is retiring and rotating the turret.

2. The combination, with a turret-actuating sleeve, a drive-shaft operatively connected with said sleeve and the forward-feed mechanism therefor, said feed mechanism comprising a loose pulley mounted upon said drive-shaft and connecting mechanism between said pulley and shaft whereby a reduced speed is imparted from the pulley to the shaft, of an automatic clutch and shifting device, one member of said clutch being attached to the loose pulley and the other member being carried by a clutch-sleeve mounted upon said shaft, a slide connected with said clutch-sleeve to impart longitudinal motion thereto, a connecting-bar running from said slide to an arm projecting from a rock-shaft, and means for automatically actuating said rock-shaft at the proper periods to throw said clutch-sleeve by means of said slide into and out of engagement with said pulley.

3. The combination, with a turret-actuating sleeve, a drive-shaft operatively connected with said sleeve, a loose pulley mounted upon said shaft, and connecting mechanism between said pulley and shaft whereby a reduced speed is imparted from the pulley to the shaft, of an automatic clutch and shifting device comprising a sleeve attached to said pulley and bearing a clutch-tooth at its free end, a clutch-sleeve mounted upon said shaft and provided with a tooth to engage that of said sleeve, a slide connected with said clutch-sleeve to impart longitudinal motion thereto, a connecting-bar running from said slide to an arm secured to a rock-shaft, a second arm projecting from said rock-shaft and having a wedge-shaped point at its free end, a spring-pressed latch-bar having a corresponding wedge-point in engagement therewith, and means for automatically actuating the rock-shaft at the proper periods to throw the point of said second arm above or below the point of the latch-bar, as and for the purpose set forth.

In testimony whereof I have affixed my signature in presence of two witnesses.

LEROY TABOR.

Witnesses:
 CHAS. MCDANIEL,
 J. E. GREEN.